Patented Oct. 30, 1928.

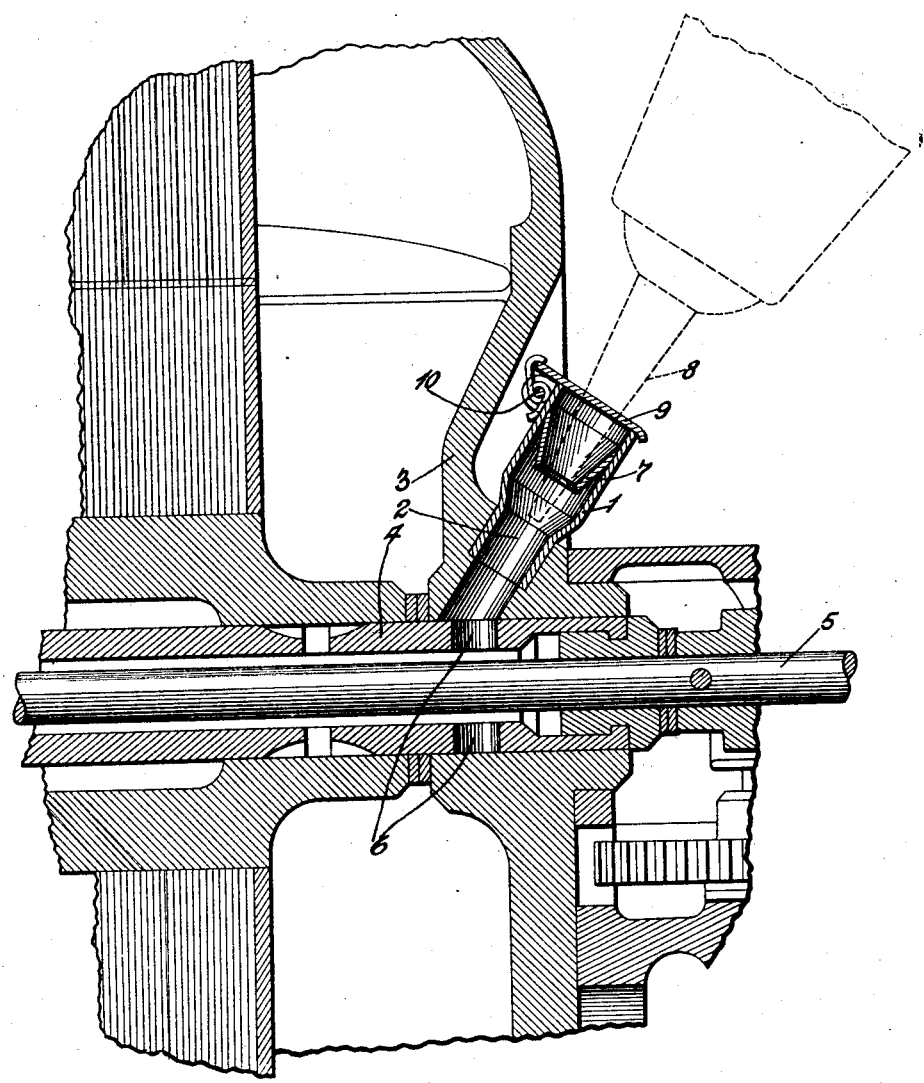

1,689,800

UNITED STATES PATENT OFFICE.

KING L. PARKER, OF ST. LOUIS, MISSOURI, ASSIGNOR TO THE EMERSON ELECTRIC MFG. CO., OF ST. LOUIS, MISSOURI, A CORPORATION OF MISSOURI.

OIL CUP.

Application filed April 2, 1927. Serial No. 180,444.

This invention relates to improvements in oil cups and consists in the novel construction hereinafter disclosed.

Heretofore, particularly in oiling electric fans, difficulty has been experienced in keeping the fan shaft bearing properly lubricated. This is largely due to the fact that the oil passage to the fan shaft bearings essentially is required to be relatively short and, in placing the spout of an oil can in the opening, the mouth of the spout contacts with the column of lubricant so that, when the can is operated by depressing a wall thereof, a suction is created which sometimes withdraws the lubricant from the passage before it passes to the bearing. This detrimental feature in the known oil cup construction, particularly in the embodiment of an electric fan, has been overcome by the structure of the present invention.

The oil cup device of the invention is illustrated in the drawing, which is a sectional view showing the device as applied to an electric fan construction, although it will be understood that it is not limited to such use.

In the embodiment of the invention illustrated in the drawing, the oil cup chamber 1 is shown as screwed in an opening 2 passing through the wall of the motor housing 3 to a sleeve 4, through which the fan shaft 5 extends. There are openings 6 through the wall of the sleeve through which the oil passes into the space between the sleeve and the shaft, through which it is carried to the shaft bearings. Obviously, as the passage 2 is in prolongation of the outlet of the oil cup, it is apparent that, if the spout is inserted through the oil cup and into the passage, the end of the spout will be in contact with the column of lubricant and a portion of the lubricant, at least, will be withdrawn, preventing proper lubrication of the operating parts.

This difficulty is overcome by the provision of an internal conical wall 7 connected with the inner wall of the oil cup chamber, said wall being disposed near the inlet end of the oil cup chamber and projecting downwardly and inwardly, terminating approximately at the center of the oil cup. The opening formed at the base of the conical wall 7 is of a diameter sufficiently small to engage the tapering wall 8 of the oil can spout to prevent the insertion of the spout far enough into the oil cup to cause the end of the spout to contact with the column of lubricant. By thus providing means for retaining the end of the oil can spout out of contact with the column of lubricant, the withdrawing of the lubricant will be prevented and the oil can may be operated in the normal manner to supply a sufficient quantity of oil to provide for proper lubrication of the operating parts of the fan.

The oil cup is provided with a cap 9 which is spring-actuated by a spring 10 to normally close the opening to the oil cup chamber.

What I claim and desire to secure by Letters Patent is:—

1. An oil cup adapted to be connected into a lubricant passage and comprising a chamber of relatively large diameter, and a conical wall within the chamber tapering inwardly in a direction from the outer end of the chamber and provided with an unobstructed opening at its inner end permitting insertion of the spout of an oil can through said opening.

2. An oil cup adapted to be connected into a lubricant passage and comprising a chamber of relatively large diameter having an open outer end, a closure for said chamber movable to and from closed position, and a conical wall rigid within said chamber tapering inwardly from the open outer end of said chamber and having an unobstructed opening at its inner end permitting insertion and withdrawal of the spout of an oil can therethrough.

KING L. PARKER.